(12) United States Patent
Salter et al.

(10) Patent No.: US 10,946,815 B1
(45) Date of Patent: Mar. 16, 2021

(54) VEHICLE BADGE ASSEMBLY

(71) Applicant: Ford Global Technologies, LLC, Dearborn, MI (US)

(72) Inventors: Stuart C. Salter, White Lake, MI (US); Aaron Bradley Johnson, Allen Park, MI (US); Luciano Lukacs, Plymouth, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/806,170

(22) Filed: Mar. 2, 2020

(51) Int. Cl.
| | | |
|---|---|---|
| *B60R 13/00* | (2006.01) | |
| *B60Q 1/26* | (2006.01) | |
| *F21V 23/04* | (2006.01) | |

(52) U.S. Cl.
CPC .......... *B60R 13/005* (2013.01); *B60Q 1/2619* (2013.01); *B60Q 2400/40* (2013.01); *F21V 23/0442* (2013.01)

(58) Field of Classification Search
CPC ......................... B60R 13/005; F21V 23/0442
See application file for complete search history.

(56) References Cited

U.S. PATENT DOCUMENTS

| | | |
|---|---|---|
| 9,446,721 B2 | 9/2016 | Jagoda |
| 10,457,201 B2 | 10/2019 | Salter et al. |
| 2010/0253919 A1 | 10/2010 | Douglas |
| 2010/0321945 A1 | 12/2010 | Lang et al. |
| 2015/0241016 A1* | 8/2015 | Sura .................. B60Q 1/50 362/509 |
| 2016/0201874 A1* | 7/2016 | Stemmer ............ F21S 43/14 362/555 |
| 2016/0231493 A1* | 8/2016 | Iordache ............ B60R 13/005 |
| 2016/0343522 A1* | 11/2016 | Kang ................. E05B 83/18 |
| 2017/0043709 A1* | 2/2017 | Dellock ............. F21V 23/003 |
| 2017/0357044 A1* | 12/2017 | Kuramitsu ......... G02B 6/0088 |
| 2018/0247777 A1* | 8/2018 | Kim .................. B60R 16/005 |
| 2018/0281674 A1* | 10/2018 | Iseki ................. B60Q 3/62 |
| 2018/0334094 A1* | 11/2018 | Myszka ............. B60Q 1/50 |
| 2019/0217659 A1 | 7/2019 | Dellock et al. |
| 2020/0189451 A1* | 6/2020 | Hellin Navarro .... G03B 21/208 |

FOREIGN PATENT DOCUMENTS

WO WO 2018/193000 * 10/2018 ............. B60Q 1/26

* cited by examiner

*Primary Examiner* — Zheng Song
(74) *Attorney, Agent, or Firm* — David Coppiellie; Price Heneveld LLP

(57) ABSTRACT

A vehicle badge system includes a housing that defines an opening and an aperture proximate the opening. The housing defines a light-transmissive feature on a side thereof. A lens is coupled to the housing proximate the opening. The lens defines at least one grating. An image-based assembly defines a sensor field to obtain data. The image-based assembly defines a projector field to display a projected image. A first light source is configured to direct light through the light-transmissive feature. A second light source is configured to direct light through the lens. The at least one grating is configured to diffract the light emitted from the second light source.

17 Claims, 11 Drawing Sheets

VEHICLE BADGE ASSEMBLY

FIELD OF THE DISCLOSURE

The present disclosure generally relates to a badge assembly. More specifically, the present disclosure relates to a badge assembly for a vehicle.

BACKGROUND OF THE DISCLOSURE

Vehicles often have an emblem indicating the manufacturer of the vehicle. The emblem can be disposed on one or more locations on an exterior of the vehicle. The emblem can be visible to onlookers in an area external to the vehicle.

SUMMARY OF THE DISCLOSURE

According to at least one aspect of the present disclosure, a vehicle badge system includes a housing that defines an opening and an aperture proximate the opening. The housing defines a light-transmissive feature on a side thereof. A lens is coupled to the housing proximate the opening. The lens defines at least one grating. An image-based assembly defines a sensor field to obtain data. The image-based assembly defines a projector field to display a projected image. A first light source is configured to direct light through the light-transmissive feature. A second light source is configured to direct light through the lens. The at least one grating is configured to diffract the light emitted from the second light source.

According to another aspect of the present disclosure, a vehicle badge assembly includes a housing that defines an opening. The housing defines at least one light-transmissive feature on a side thereof. A lens is coupled to the housing proximate the opening. The lens defines an optic. A first light source is disposed in the housing. The first light source is configured to emit light through the lens to produce an image. A second light source is disposed within the housing. The second light source is configured to direct light through the at least one light-transmissive feature.

According to another aspect of the present disclosure, a badge assembly for a vehicle includes a base. A housing is coupled to the base. The housing defines a first light-transmissive feature on a first side and a second light-transmissive feature on a second side. A lens is coupled to the housing. A first light source is disposed within the housing and is configured to direct light through the first light-transmissive feature. A second light source is disposed within the housing and is configured to direct light through the second light-transmissive feature.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
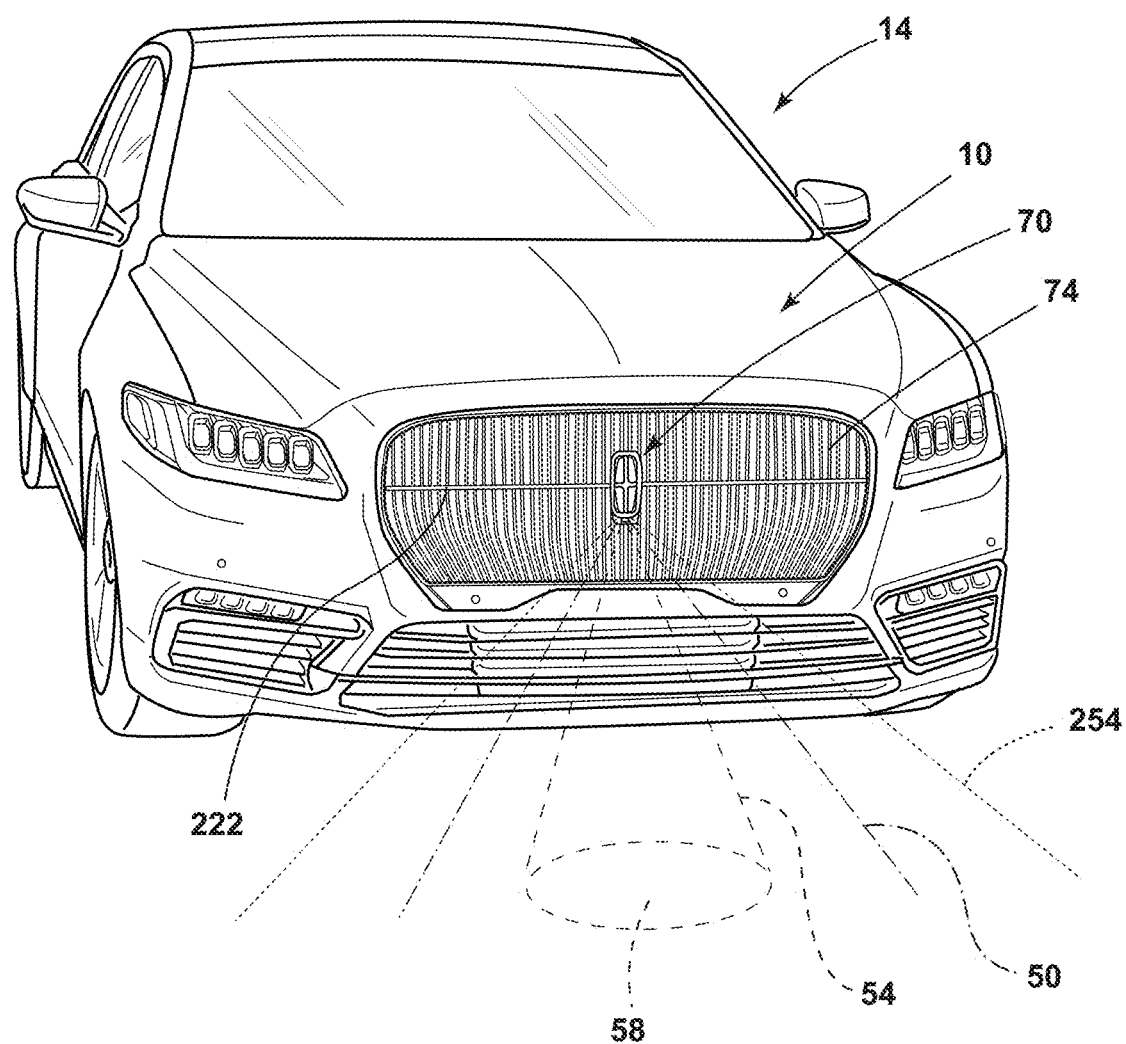
FIG. 1 is a front perspective view of a vehicle, according to one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-13, reference numeral 10 generally refers to a badge system for a vehicle 14. A housing 18 defines an opening 22 and an aperture 26 proximate the opening 22. The housing 18 defines a light-transmissive feature 30 on a side 34 thereof. A lens 38 is coupled to the housing 18 proximate the opening 22. The lens 38 defines at least one optic, such as a grating 42. An image-based assembly 46 defines a sensor field 50 to obtain data. The image-based assembly 46 defines a projector field 54 to display a projected image 58. A first light source 62 is configured to direct light 64 through the light-transmissive feature 30. A second light source 66 is configured to direct light 68 through the lens 38. The grating 42 is configured to diffract the light 68 emitted from the second light source 66.

Referring to FIG. 1, the vehicle 14 can be any style vehicle 14, such as, for example, a sedan, a truck, a van, a crossover, a sports utility vehicle, or another style of vehicle 14. The vehicle 14 may be a manually operated vehicle 14 (e.g., with a human driver), fully autonomous vehicle 14 (e.g., no human driver), or a partially autonomous vehicle 14 (e.g., may be operated with or without a human driver). Additionally, the vehicle 14 may be utilized for personal and/or commercial purposes, such as, for ride providing services (e.g., chauffeuring) and/or ride-sharing services.

The badge system 10 includes a badge assembly 70 coupled to the exterior of the vehicle 14. The badge assembly 70 can be disposed in a variety of locations on the vehicle 14. As illustrated in FIG. 1, the badge assembly 70 is centrally located on a grille 74. The badge assembly 70 can be any design, pattern, logo, image, symbol, or other feature. Typically, the badge assembly 70 designates a manufacturer of the vehicle 14.

Figure 2:
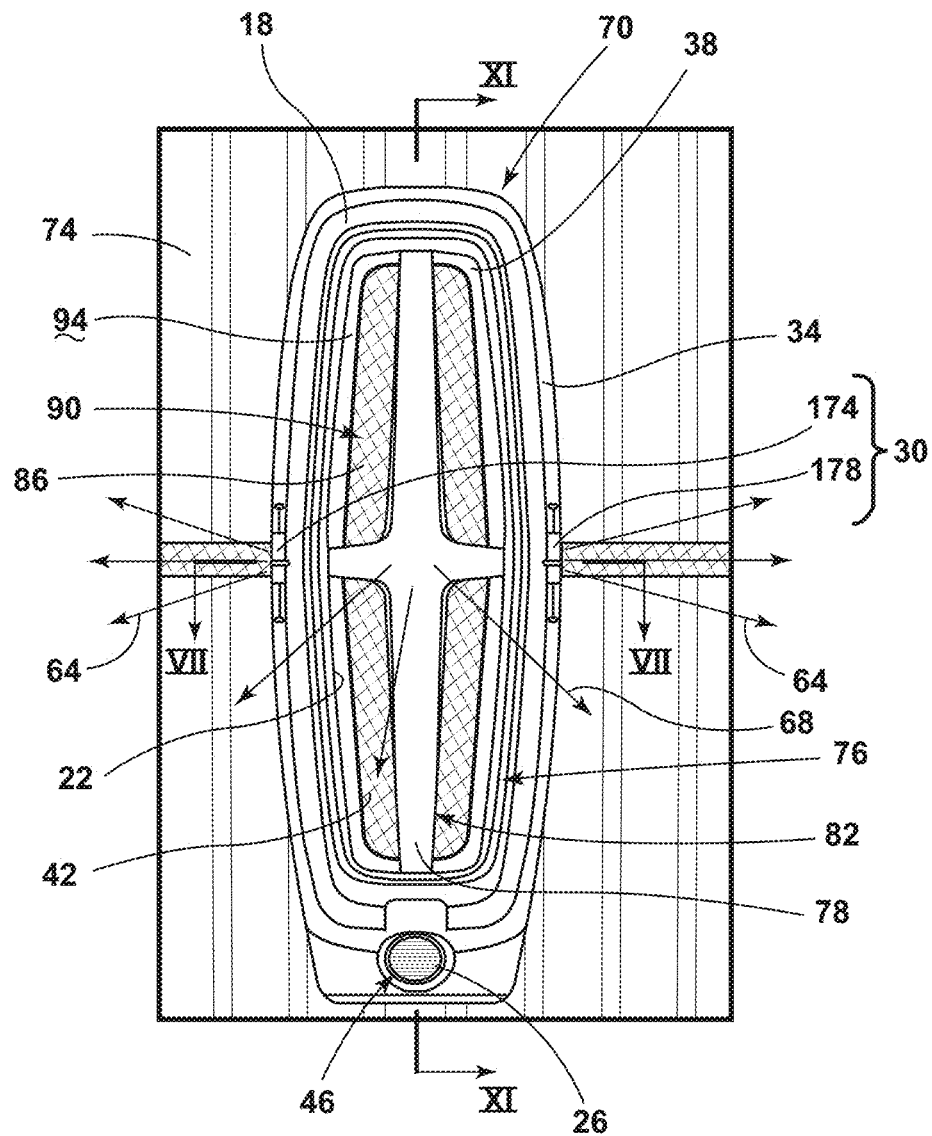
FIG. 2 is a front perspective view of a vehicle badge assembly disposed on a grille, according to one example.

Referring to FIG. 2, the badge assembly 70 includes the housing 18 coupled to the grille 74. The housing 18 can have any practicable shape and/or size without departing from this disclosure. As illustrated, the housing 18 defines a substantially oblong shape. The shape of the housing 18 may depend on the specific information to be displayed by the badge assembly 70. The housing 18 includes the side 34 extending from the grille 74. The side 34 of the housing 18 may define the light-transmissive feature 30. Additionally or alternatively, the housing 18 may define the opening 22, which may be centrally located within the housing 18. In various examples, the lens 38 may substantially fill the opening 22.

The housing 18 may be constructed of any practicable material that can withstand changes in temperature and other weather conditions experienced by the exterior of the vehicle 14. For example, the housing 18 may be constructed of a polymeric material, such as plastic materials. In a specific example, the plastic materials may be a heat conductive plastic configured to transfer heat away from components disposed within the badge assembly 70.

According to various aspects, the badge assembly 70 includes the lens 38 and the image-based assembly 46. The lens 38 may correspond with the opening 22. The housing 18 may define the aperture 26 proximate the opening 22 and the image-based assembly 46 may correspond with the aperture 26. As illustrated in FIG. 2, the aperture 26 is disposed below the opening 22. The aperture 26 may be a smaller size than the opening 22. The aperture 26 may be sized to accommodate the image-based assembly 46, which may be coupled to the housing 18 proximate the aperture 26.

Referring still to FIG. 2, the lens 38 may be coupled to the housing 18 proximate the opening 22. The lens 38 can substantially fill the opening 22 of the housing 18. The lens 38 may be light transmissive, such that light 68 may be directed through the lens 38. In various examples, all or portions of the lens 38 may be substantially clear to allow the light 68 to be directed therethrough. Additionally or alternatively, all or portions of the lens 38 may be translucent, transparent, semi-transparent, semi-opaque, opaque, and/or a combination thereof to provide different lighting effects of the badge assembly 70. In a non-limiting example, where all or a portion of the lens 38 is opaque, the light 68 may provide for a backlit or glowing effect to the badge assembly 70. The light 68 may be directed toward the lens from inside the housing 18 within the badge assembly 70. Further, ambient light 72, such as sunlight (FIG. 5B) may be directed toward and/or through the lens 38 from an area external to the vehicle 14.

The lens 38 can include one or more optics, such as the grating 42. The gratings 42 can be defined in the lens 38, or alternatively, can be defined in films applied to the lens 38. The gratings 42 can cover all or a portion of the lens 38. The pattern defined by the gratings 42 can be substantially the same across the lens 38, or alternatively, the gratings 42 can provide more than one pattern across the lens 38 to provide the selected design for the badge assembly 70. However, it is also contemplated that the gratings 42 may not form a pattern, and may instead be arranged randomly. The gratings 42 may define a variety of patterns. When the light 68, 72 (FIG. 5B) impinges on the gratings 42, a holographic image 76 can be produced. The holographic image 76 may have a floating appearance, such that the holographic image 76 may appear to float within the badge assembly 70. The holographic image 76 can be at least one of a logo, word, design, pattern, combination thereof, and/or another image feature.

As illustrated in FIG. 2, the gratings 42 (e.g., first gratings) define a first pattern 78 producing a first image 82 when the light 68 interacts with the gratings 42, and a second pattern 86 producing a second image 90 when the light 68 interacts with the gratings 42 (e.g., second gratings). Additionally or alternatively, a first type of grating 42 can form the first image 82 and a second type of grating 42 can form the second image 90. In a non-limiting example, the first image 82 is configured as a logo, and the second image 90 is configured as a background for the logo, such that the logo appears to be floating within the badge assembly 70.

Figure 3:
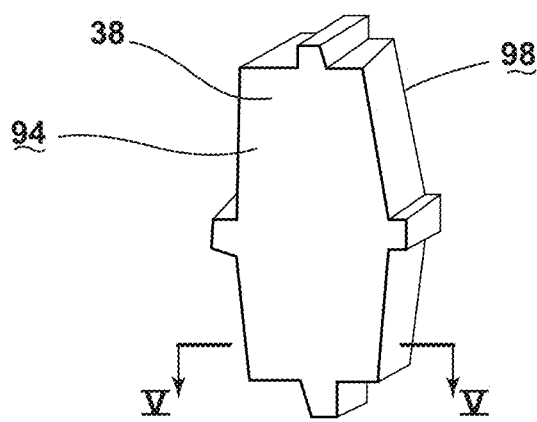
FIG. 3 is a front perspective view of a lens for a vehicle badge assembly, according to one example.
Figure 4:
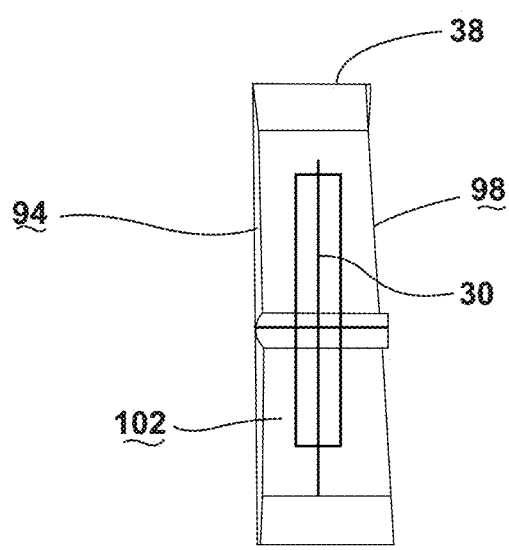
FIG. 4 is a side view of the lens of FIG. 3.

Referring to FIGS. 2-4, the lens 38 includes an outer surface 94 and an inner surface 98. The gratings 42 can be defined on one or both of the inner surface 98 and the outer surface 94. Additionally or alternatively, the gratings 42 may be defined between the outer and inner surfaces 94, 98 (e.g., within the lens 38). In a non-limiting example, the outer surface 94 of the lens 38 may be free of gratings 42, such that the outer surface 94 is substantially smooth or flat. A smooth or flat outer surface 94 may be advantageous for reducing dirt, pollen, and/or other environmental aspects from being retained on the lens 38. Moreover, the gratings 42 defined within the lens 38 and/or by the inner surface 98 of the lens 38 may reduce the overall size of the badge assembly 70.

The lens 38 can have a variety of configurations based on the selected design of the badge assembly 70. As illustrated, the lens 38 defines a shape that corresponds with the logo produced by the first and second patterns 78, 86 defined by the gratings 42 where the light 68 impinges the gratings 42. The badge assembly 70 of FIG. 2 illustrates the first and second patterns 78, 86, however, as illustrated in FIGS. 3 and 4, the first and second patterns 78, 86 may not be visible on the outer surface 94. In such configurations, the outer surface 94 is substantially smooth or flat, such that the gratings 42 may not be visible from an area external to the vehicle 14 (FIG. 1).

As illustrated in FIG. 4 a side surface 102 of the lens 38 can allow for the light-transmissive feature 30 to be visible. The side surface 102 of the lens 38 may be free of the gratings 42. The light 64 (FIG. 2) may be emitted through the light-transmissive feature 30 with little or no diffraction to provide for an illuminated feature on the side 34 of the badge assembly 70. Additionally or alternatively, the side surfaces 102 may include optics configured to diffuse and/or disperse the light 64 to provide even illumination of the light-transmissive feature 30. The light-transmissive feature 30 may be centrally located on each lateral side 34 of the badge assembly 70 to provide a unique appearance.

Figure 5A:
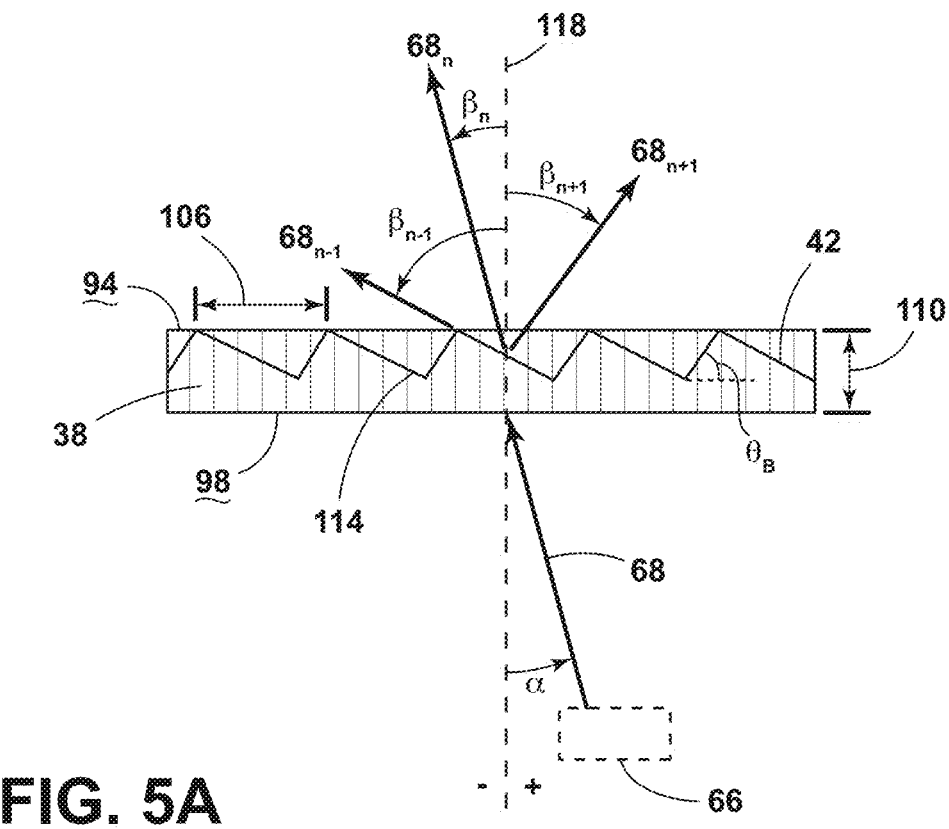
FIG. 5A is a cross-sectional view of a grating defined by the lens of FIG. 3, taken at line V-V with the grating diffracting light from a light source.
Figure 5B:
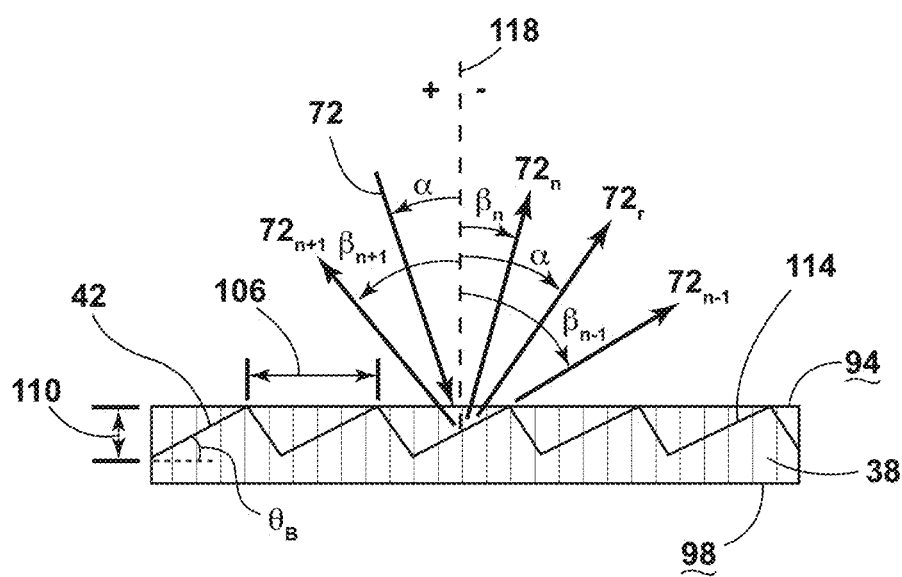
FIG. 5B is a cross-sectional view of a grating defined by the lens of FIG. 3, taken at line V-V with the grating diffracting ambient light.

Referring to FIGS. 5A and 5B, the lens 38 may include one or more gratings 42. The gratings 42 and the lens 38 may have a variety of configurations based on the configuration of the badge assembly 70 and the selected appearance of the badge assembly 70. The gratings 42 may extend across the entire lens 38, or across discrete portions of the lens 38. The gratings 42 may include a ruled grating having ridges and grooves. Additionally or alternatively, the gratings 42 may include a holographic grating pattern having a sinusoidal shape. Additionally or alternatively, the gratings 42 may include a spaced-holographic pattern having alternating plateaus and rounded grooves. The lens 38 may include a single type of grating 42 (e.g., ruled, holographic, or spaced holographic), or more than one type of grating 42. In examples with more than one type of grating 42 defined by the lens 38, the different gratings 42 may have different properties (e.g., spacing, thickness 110, blaze angle ΘB, etc.), which may cause each grating 42 to diffract light 68, 72 differently (i.e., be noticeably different from one another).

The gratings 42 may be configured to diffract and scatter light 68, 72 impinging on the lens 38. The gratings 42 are optical components with a periodic structure, which splits and diffracts light into several beams traveling in different directions. The directions of these beams depend on the spacing of the grating 42 and the wavelength of the light 68, 72. The gratings 42 acts as a dispersive element. The gratings 42 may be configured to produce an iridescent pattern from the light 68, 72 impinging upon the gratings 42. The gratings 42 may be present on a flat surface, a curved surface, or any other shaped surface of the lens 38.

In various examples, the gratings 42 may be configured to reflect light of different wavelengths in different directions. The gratings 42 may have a thickness 110 of less than or equal to about 700 nm. The thickness 110 of the grating 42 may affect the optical properties of the lens 38.

As depicted in FIGS. 5A and 5B, in an exemplary form, the gratings 42 may define a plurality of ridges 114 having a sawtooth or triangular shape. In three dimensions, the ridges 114 of the gratings 42 can appear with a stepped or sawtooth shape without angular features, pyramidal in shape, or some combination of stepped and pyramidal shapes. Other shapes of the ridges 114 of the gratings 42 include hill-shaped features (e.g., sinusoidal or curved-shaped features). The gratings 42 can include portions with a combination of triangular and hill-shaped ridges.

The shape or shapes of the gratings 42 affect the blaze angle ΘB. The blaze angle ΘB is the angle between the step normal 118 (i.e., the direction normal 118 to each step or tooth of the grating 42) and a direction normal to a surface of each grating 42. Generally, the blaze angle ΘB is optimized to maximize the efficiency of the wavelength of the light 68, 72 diffracted by the gratings 42.

As illustrated in FIG. 5A, the light 68 impinging upon the grating 42 may be light 68 emitted from the second light source 66 and directed toward and/or through the lens 38. The light 68 can impinge on the grating 42 as the light 68 travels through the lens 38. Accordingly, the light 68 can be directed through the inner surface 98 of the lens 38, impinge on the gratings 42, and be directed through the outer surface 94 of the lens 38. When the light 68 interacts with the gratings 42, the gratings 42 can diffract the light 68 into one or more directions.

As illustrated in FIG. 5B, the light 72 impinging on the grating 42 may be incident or ambient light 72 (e.g., sunlight). The ambient light 72 can be directed towards and/or through the lens 38 and impinge on the gratings 42. Accordingly, the light 72 can be directed through the outer surface 94 of the lens 38, impinge on the gratings 42, and be redirected through the outer surface 94 of the lens 38. When the ambient light 72 interacts with the gratings 42, the gratings 42 can diffract the light 72 into one or more directions.

The blaze angle $\Theta_B$ is optimized to maximize the efficiency of the wavelength of the light, which may be ambient sunlight 72 and/or the light 68 from the second light source 66. The blaze angle $\Theta_B$ can ensure that the maximum optical power is concentrated in one or more diffraction orders while minimizing residual power and other orders (e.g., the zeroth-order indicative of the ambient light 72 itself). In various examples, a constant blaze angle $\Theta_B$ and the period 106 may result in inconsistent, reflected and diffracted light (e.g., n−1, n, n+1, n+n, etc.) produced from the gratings 42.

The gratings 42 may be characterized by one or more periods 106. In various aspects, the period 106 of the gratings 42 may be maintained between from about 400 nm to about 800 nm for ruled and/or holographic grating patterns. For spaced holographic grating patterns, each cut (e.g., rounded grooves) may have a width in a range of from about 400 nm to about 800 nm. The spacing patterns and sizes may be configured to diffract white light into the entire visible light spectrum.

Referring still to FIGS. 5A and 5B, the gratings 42 may include varying periods 106 that vary between any number of values, such as, for example between two and ten discrete values. The varying periods 106 can be employed in one or more portions of the lens 38. One or more of the gratings 42 may have a constant period 106, which may be employed in other portions relative to the varying period 106 of the lens 38 to create interesting, jewel-like effects on the lens 38. There may be a plurality of gratings 42 arranged on the lens 38, which may be adjacent to one another, or alternatively, may be arranged in a spaced-apart configuration. Each of the plurality of gratings 42 may have the same or different period 106.

The light 68, 72 may impinge on the gratings 42 at an incident angle α. A portion of the light striking the gratings 42 at the incident angle α is reflected light (e.g., $72_r$), which is reflected at the same angle α. The remaining portion of the light 68, 72 is diffracted at particular wavelengths corresponding to diffracted light (e.g., $68_n$, $68_{n+1}$, etc. and $72_n$, $72_{n+1}$, etc.) at corresponding diffraction angles (e.g., $β_n$, $β_{n+1}$, etc.). The reflected light r is indicative of the zeroth-order, (i.e., n=0). The diffracted light (i.e., n) is indicative of the nth order fraction, where n is an integer corresponding to particular wavelengths of the reflected or diffracted light.

Figure 6:
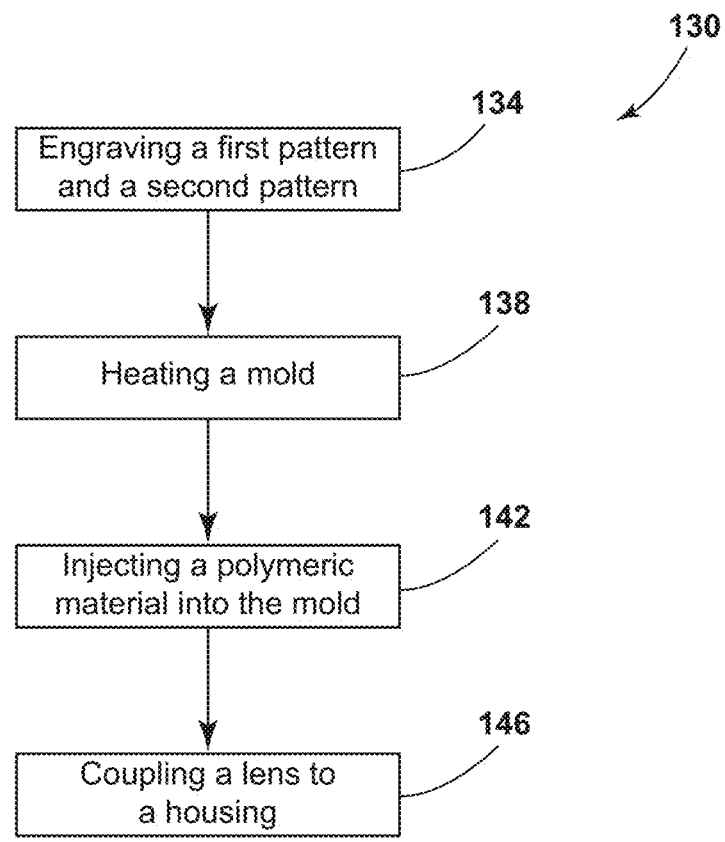
FIG. 6 is a flow diagram of a method of manufacturing a vehicle badge assembly, according to one example.

Referring to FIG. 6, and with further reference to FIGS. 2-5B, a method 130 of manufacturing the lens 38 includes step 134 of engraving one or more patterns into a tool or mold. The engravings may be configured as a mirror image of the first and second patterns 78, 86 that are formed in the lens 38. The engraving, or nano-engravings, may be accomplished with a femtosecond laser, which may be advantageous for providing minute details for the gratings 42.

The femtosecond laser may be configured to pulse ultraviolet and/or infrared light at a high rate of speed in a surface of the mold or tool used to form the lens 38. The pulse duration can be in a range of from about 200 femtoseconds ($200 \times 10^{-15}$ seconds) to about 1 picosecond ($1 \times 10^{-12}$ seconds). In a non-limiting example, the femtosecond laser may pulse infrared light at a rate of about $150 \times 10^{-15}$ seconds. The wavelengths of ultraviolet and/or infrared light pulsed in this range of speed may be configured to ablate a surface of the mold with a minimal heat-affected zone. The femtosecond laser can also reduce micro-cracks formed in the mold during the engraving process. The femtosecond laser emitting short pulses at high peak powers may be advantageous for forming the grating patterns into the mold. The surface of the mold may be cold ablated with reduced pressure, which can result in a reduced heat-affected zone and/or reduced burrs or filigree structures.

The engravings in the mold may have a depth in a range of from about 100 nm to about 300 nm. The engravings may produce the gratings 42 having a thickness 110 in a range of from about 100 nm to about 300 nm, respectively. The engravings may be applied to the entire surface of the mold, or discrete portions of the surface of the mold based on the selected first and second patterns 78, 86. The femtosecond laser can produce features as thin as about 100 nm in thickness with Gaussian, square, and/or triangular shape. Accordingly, the resulting gratings 42 may have a thickness 110 of about 100 nm.

In step 138, the mold is heated. The surface of the mold adjacent to a cavity may be heated by induction heating, steam, hot oil, or another method of heating the mold. One or both sides of the mold can be heated. In induction heating examples, heating elements may be coupled to the mold behind the surfaces that define the cavity that receives materials for forming the lens 38. The heating of the mold having the engravings may allow for the material subsequently inserted into the mold cavity to remain highly viscous and fill the minute details produced by the femtosecond laser.

In step 142, a polymeric material or other material for forming the lens 38 is injected into the cavity formed by the mold. The polymeric material, or other similar material, is warmed through the heating of the mold. The polymeric material flows into the engravings to form the gratings 42.

In various examples, the material of the polymeric material may be in liquid form under normal conditions (e.g., pressure, temperature, etc.). As such, the liquid material may be viscous with or without the heated mold. The polymeric material may flow into the mold and fill the engravings in the mold surface. Accordingly, the engravings in the mold surface may be a mirror image of the selected gratings 42 to be integrally defined by the polymeric material. The polymeric material may include polyurethane and/or polyuria, which may be advantageous for defining the gratings 42 formed by the femtosecond laser. Step 142 may include cooling and/or curating the polymeric material to form the lens 38 of the badge assembly 70, as well as removing the lens 38 from the mold.

In step 146, the lens 38 may be coupled to the housing 18 to at least partially assemble the badge assembly 70. The lens 38 can be arranged with the gratings 42 on the outer surface 94 and/or the inner surface 98. The lens 38 can substantially fill the opening 22, such that the gratings 42 are aligned to diffract the light 68 emitted from the second light source 66.

Figure 7:
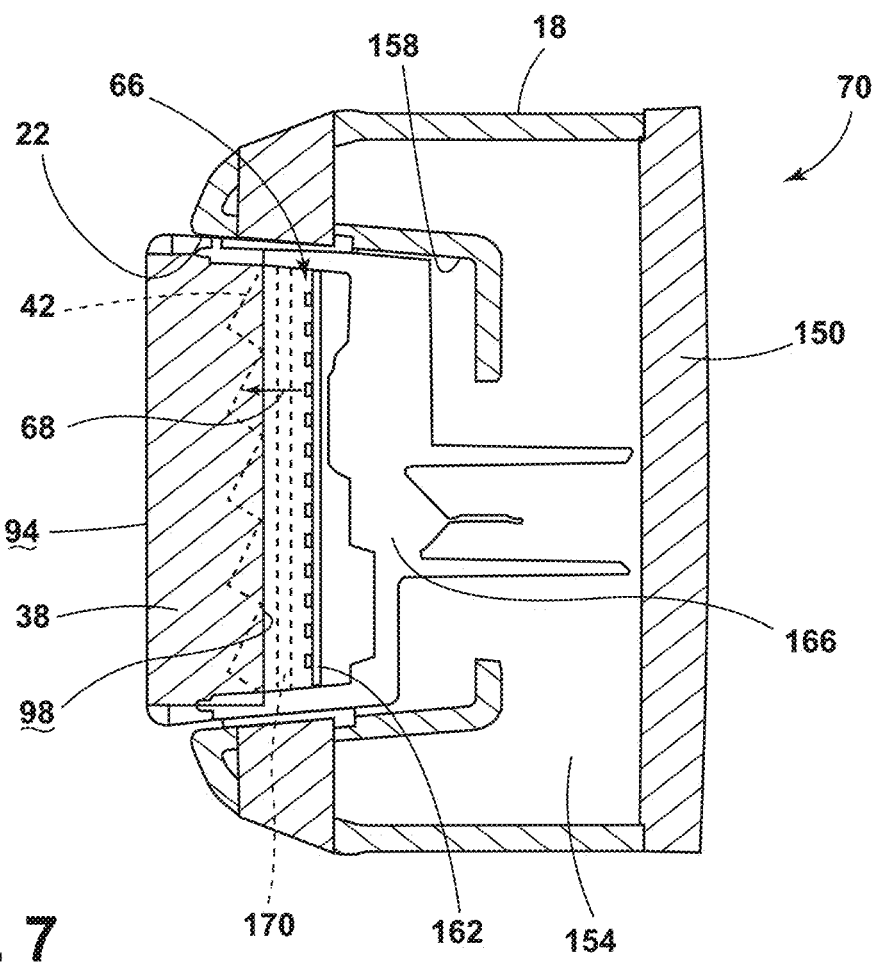
FIG. 7 is a cross-sectional view of the vehicle badge assembly of FIG. 2, taken at line VII-VII.

Referring to FIGS. 2 and 7, the housing 18 may be coupled to a base 150 defining an interior cavity 154 therein. The base 150 may be coupled to an outer surface of the grille 74, or elsewhere on the vehicle 14 (FIG. 1). The housing 18 includes a receiving portion 158 proximate the opening 22. The receiving portion 158 may receive the lens 38, as well as other components of the badge assembly 70. The inner surface 98 of the lens 38 may be disposed within the receiving portion 158 of the housing 18, and the outer surface 94 of the lens 38 may be offset from the housing 18. In this configuration, the lens 38 extends at least partially out of the housing 18.

A printed circuit board (PCB) 162 may be disposed within the receiving portion 158 of the housing 18 adjacent to the inner surface 98 of the lens 38. In a non-limiting example, the PCB 162 may be an aluminum core PCB, which may be advantageous for reducing heat produced by the second light source 66. The PCB 162 may be configured as a flexible or rigid circuit board. The second light source 66 may be disposed on the PCB 162 and configured to direct light toward and/or through the lens 38.

The second light source 66 may be configured as a single light source or more than one light source disposed in a pattern or randomly across the PCB 162. When configured as more than one light source, each light source of the second light source 66 may be selectively and/or independently controlled, such that one, all, or a portion of the light sources can be activated at any given time. The second light source 66 may be configured to emit visible light that has a wavelength in a range of from about 380 nm to 740 nm. The second light source 66 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid and/or any other similar device. Any other form of lighting may be utilized within the badge assembly 70 without departing from the teachings herein. Further, various types of LEDs are suitable for use within as the second light source 66 including, but not limited to, top-emitting LEDs, side-emitting LEDs, and others. Moreover, multicolored light sources such as Red, Green, and Blue (RGB) LEDs that employ red, green, blue LED packaging may be used to generate various desired colors of light outputs from a single light source, according to known light color mixing techniques.

The badge assembly 70 may include a heatsink 166 disposed adjacent to the PCB 162. The heatsink 166 may be disposed within the receiving portion 158 of the housing 18. In the illustrated example of FIG. 7, the second light source 66 may be disposed on a first side of the PCB 162 and the heatsink 166 may be disposed adjacent to an opposing side of the PCB 162. The heatsink 166 may be integrally formed with the housing 18, or alternatively, may be a separate component coupled to the housing 18. The heatsink 166 may be formed of similar materials as the housing 18. For example, the heatsink 166 may be formed of a heat conductive plastic, which may be advantageous for transferring heat away from the PCB 162. It is contemplated that additional electronics may be disposed within the badge assembly 70, and the heatsink 166 may operate to transfer heat away from the various electronic components.

Figure 8:
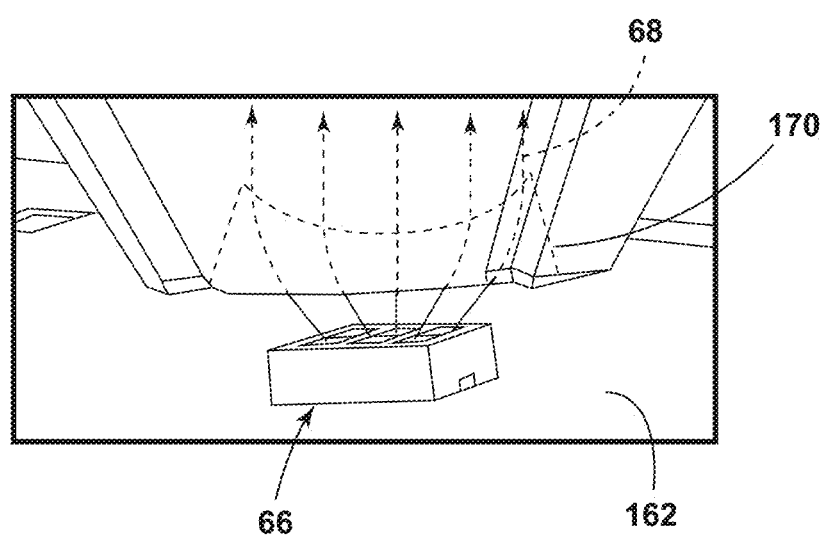
FIG. 8 is a side perspective view of an optical member of the vehicle badge assembly of FIG. 7.

Referring to FIGS. 7 and 8, an optical number 170 may be disposed between the second light source 66 and the inner surface 98 of the lens 38. The optical member 170 may include one or more optics configured to direct the light 68 emitted from the second light source 66. As best illustrated in FIG. 8, the optical member 170 may be a specified prescription near field lens (NFL) that collimates the light 68 emitted from the second light source 66. The optical member 170 may be configured to have one or more NFLs that corresponds with the second light source 66. For example, the second light source 66 may include more than one LED. Each LED can correspond with an NFL. The light 68 from each LED can be directed toward the NFL. The NFL can collimate and spread the light 68 from each LED to excite the holographic image 76. Having an NFL of the optical member 170 correspond with each second light source 66 (e.g., each LED) may provide for a more even distribution of light 68 emitted through the lens 38, and therefore, a more even illumination and excitation of the holographic image 76.

Referring to FIGS. 2, 7, and 8, the light 68 emitted from the second light source 66 may be collimated and spread by the optical member 170 and directed through the lens 38. The light 68 may impinge upon the gratings 42. The light 68 impinging upon the diffraction grating 42 defining the first pattern 78 may produce the first effect or image 82, and the light 68 impinging upon the second pattern 86 defined by the gratings 42 can produce the second effect or image 90. The first and second images 86, 90 may produce a combined holographic image 76, such that the badge assembly 70 appears to have a floating image on the lens 38. The gratings 42 may be configured to diffract the light 68 from the second light source 66 to produce the selected holographic image 76. It is contemplated that various electronics within the badge assembly 70 may assist in producing the holographic image 76 displayed on the badge assembly 70.

Figure 9:
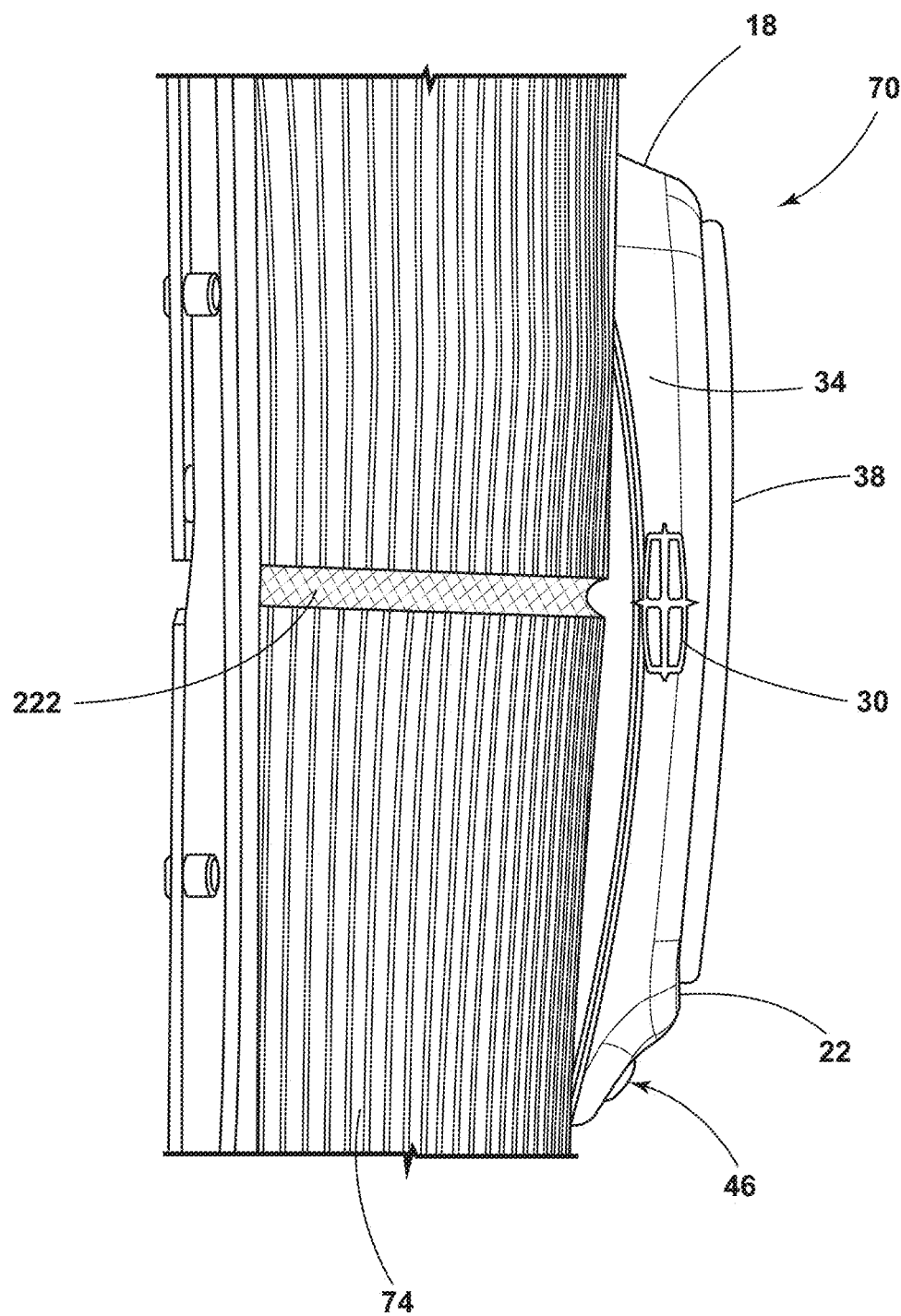
FIG. 9 is a side perspective view of a vehicle badge assembly having a light-transmissive feature.

Referring to FIGS. 2 and 9, the light-transmissive feature 30 may be defined in the side 34 of the housing 18. The light-transmissive feature 30 may define at least one of a logo, word, design, pattern, a combination thereof, and/or any other feature. In various examples, the light-transmissive feature 30 may be translucent, transparent, semi-transparent, semi-opaque, opaque, and/or a combination thereof to provide different lighting effects of the badge assembly 70, thereby allowing at least some light 64 to be directed therethrough. In a non-limiting example where a portion or all of the light-transmissive feature 30 is opaque, the light 64 may provide for a backlit or glowing effect to the badge assembly 70. In a non-limiting example where a portion or all of the light-transmissive feature 30 is transparent, the light-transmissive feature 30 may operate as a window providing bright illumination.

According to various aspects, the light-transmissive feature 30 may be a window in the housing 18 that allows light 64 to be emitted therethrough in a selected pattern, design, image, logo, etc. The badge assembly 70 may define more than one light-transmissive feature 30. For example, the housing 18 may define a first light-transmissive feature 174 and a second light-transmissive feature 178 in opposing portions of the housing 18 (e.g., right and left sides). The first and second light-transmissive features 174, 178 may be a substantially similar image as produced by the gratings 42 of the lens 38 (e.g., all or a portion of the holographic image 76). For example, holographic image 76 may be a logo and the first and second light-transmissive features 174, 178 may be the same or similar logo.

Figure 10:
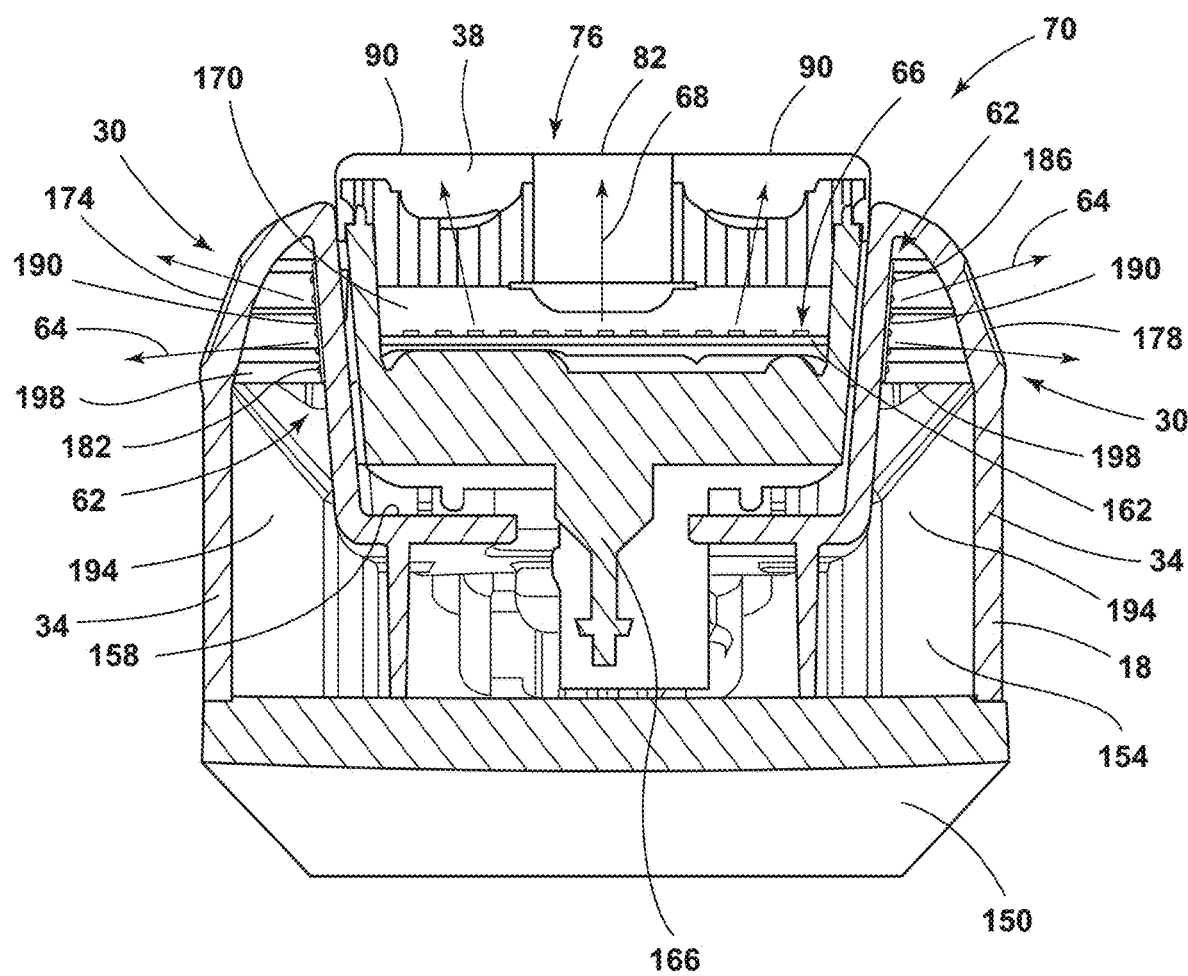
FIG. 10 is a cross-sectional view of the vehicle badge assembly of FIG. 2, taken at line VII-VII.

Referring to FIGS. 9 and 10, the badge assembly 70 includes the first light source 62 configured to emit light through the light-transmissive feature 30. The first light source 62 may be configured to emit visible light that has a wavelength range from about 300 nm to about 740 nm. The first light source 62 may be a single light source or multiple light sources disposed randomly or in a pattern. The first light source 62 may include any form of light source or any configuration as previously discussed with respect to the second light source 66.

The badge assembly 70 may include additional circuit boards 190 disposed on opposing sides of the PCB 162. The circuit boards 190 may be printed circuit boards and can be configured as flexible or rigid circuit boards. The circuit boards 190 may be disposed within the receiving portion 158 of the housing 18, or alternatively, may be disposed in channels 194 defined on opposing sides of the receiving portion 158.

In various examples, the first light source 62 may be separated into a first lighting portion 182 and a second lighting portion 186. Each of the first and second lighting portions 182, 186 may include a single or multiple light sources of the first light source 62. The first and second lighting portions 182, 186 of the first light source 62 may be disposed on the respective circuit boards 190. The first lighting portion 182 may be configured to direct light 64 toward and/or through the first light-transmissive feature 174. The second lighting portion 186 may be configured to direct light 64 toward and/or through the second light-transmissive feature 178. Each of the first and second lighting portions 182, 186 may be selectively and/or independently controlled, such that one, all, or a portion of the first light source 62 may be activated at any given time. In this way, the badge assembly 70 can include three lighting features (e.g., the first and second lighting portions 174, 178 of the first light source 62 and the second light source 66).

Referring still to FIGS. 9 and 10, the badge assembly 70 may include light guides 198 configured to direct the light 64 emitted by the first light source 62. Accordingly, the badge assembly 70 may include two light guides 198, with one light guide 198 extending between the first lighting portion 182 and the first light-transmissive feature 178 and a second light guide 198 extending between the second lighting portion 186 and the second light-transmissive feature 178. The light guides 198 may be configured to direct light 64 from the first light source 62 through each of the first and second light-transmissive features 174, 178. This may be advantageous for increasing the intensity of the illumination of the first and second light-transmissive features 174, 178. One or more optics may be coupled with and/or disposed in the light guides 198. In such configurations, the optics may be configured to collimate and/or disperse the light emitted by the first light source 62 to provide an even illumination of the first and second light-transmissive features 174, 178.

Referring to FIG. 10, the first light source 62 may be configured to emit light 64 through light-transmissive feature 30 defined in the side 34 of the housing 18. The second light source 66 may be configured to direct light 68 through the lens 38 coupled with the housing 18. The first light source 62 may be configured to direct light 64 in a first direction, and the second light source 66 may be configured to direct light 68 in a second direction substantially normal to the first direction. In this way, light 64, 68 may be emitted from the badge assembly 70 through the lens 38, as well as one or both of the first and second light-transmissive features 174, 178.

Each of the lens 38 and the first and second light-transmissive features 174, 178 may be substantially clear to allow the light 64, 68 to be directed therethrough. Additionally or alternatively, the lens 38 and the light-transmissive feature 30 of the badge assembly 70 may have any degree of light transmissivity. In a non-limiting example, the lens 38 and/or the light-transmissive feature 30 may be tinted to provide a colored effect of the illumination of the badge assembly 70.

Figure 11:
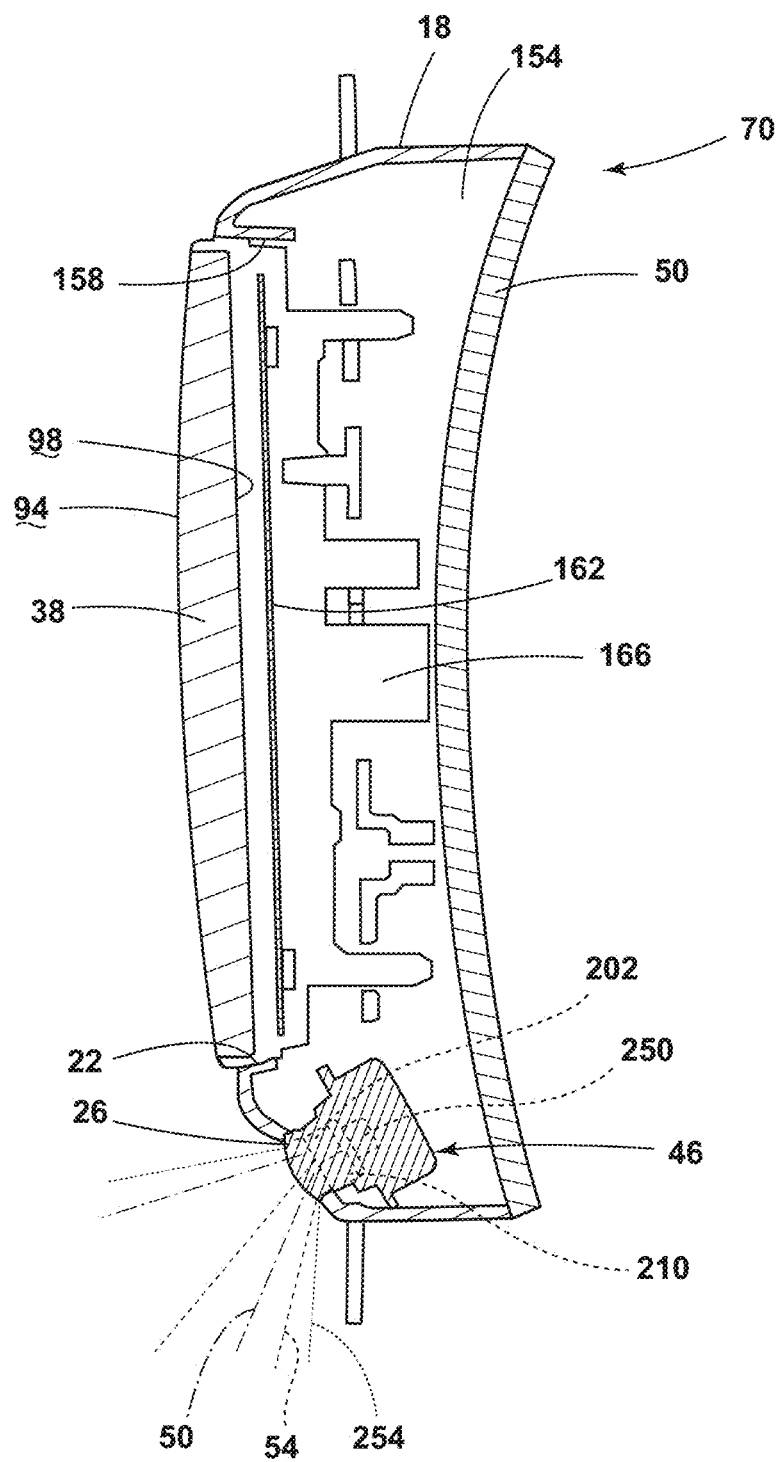
FIG. 11 is a cross-sectional view of the vehicle badge assembly of FIG. 2, taken at line XI-XI.

Referring to FIGS. 1, 2, and 11, the housing 18 may define the aperture 26 adjacent to the opening 22. The image-based assembly 46 may be coupled to the housing 18 and may be configured to align with the aperture 26. For example, the image-based assembly 46 may be disposed at least partially within the interior cavity 154 defined by the housing 18. According to various aspects, the image-based assembly 46 may include an imager 202, such as a charge-coupled device (CCD), a complementary metal-oxide-semiconductor CMOS imager, or any type of color or black-and-white camera. The imager 202 may define the sensor field 50 extending from the image-based assembly 46. As illustrated in FIG. 1, the sensor field 50 extends forwardly of the vehicle 14. The imager 202 may be configured to obtain image data from the sensor field 50. The imager 202 may provide for a camera mode of the image-based assembly 46, which may be advantageous for security purposes and/or parking assistance.

The image-based assembly 46 may additionally or alternatively include a projector 210. The projector 210 may define the projector field 54 extending from the image-based assembly 46 to project and/or display the projected image 58. As illustrated in FIG. 1, the projector field 54 extends forward of the vehicle 14 to display the projected image 58 on a ground area adjacent to the vehicle 14. The projector 210 may allow the image-based assembly 46 to be operated in a projector mode to produce the projected image 58. The projected image 58 may be any practicable image, such as a symbol, a logo, word, design, pattern, or any other visual feature. In a non-limiting example, the projected image 58 may be substantially similar to the holographic image 76 displayed on the lens 38 and/or the light-transmissive feature 30. The positioning of the image-based assembly 46 relative to the housing 18 may maximize the sensor field 50 and the projector field 54.

Figure 12:
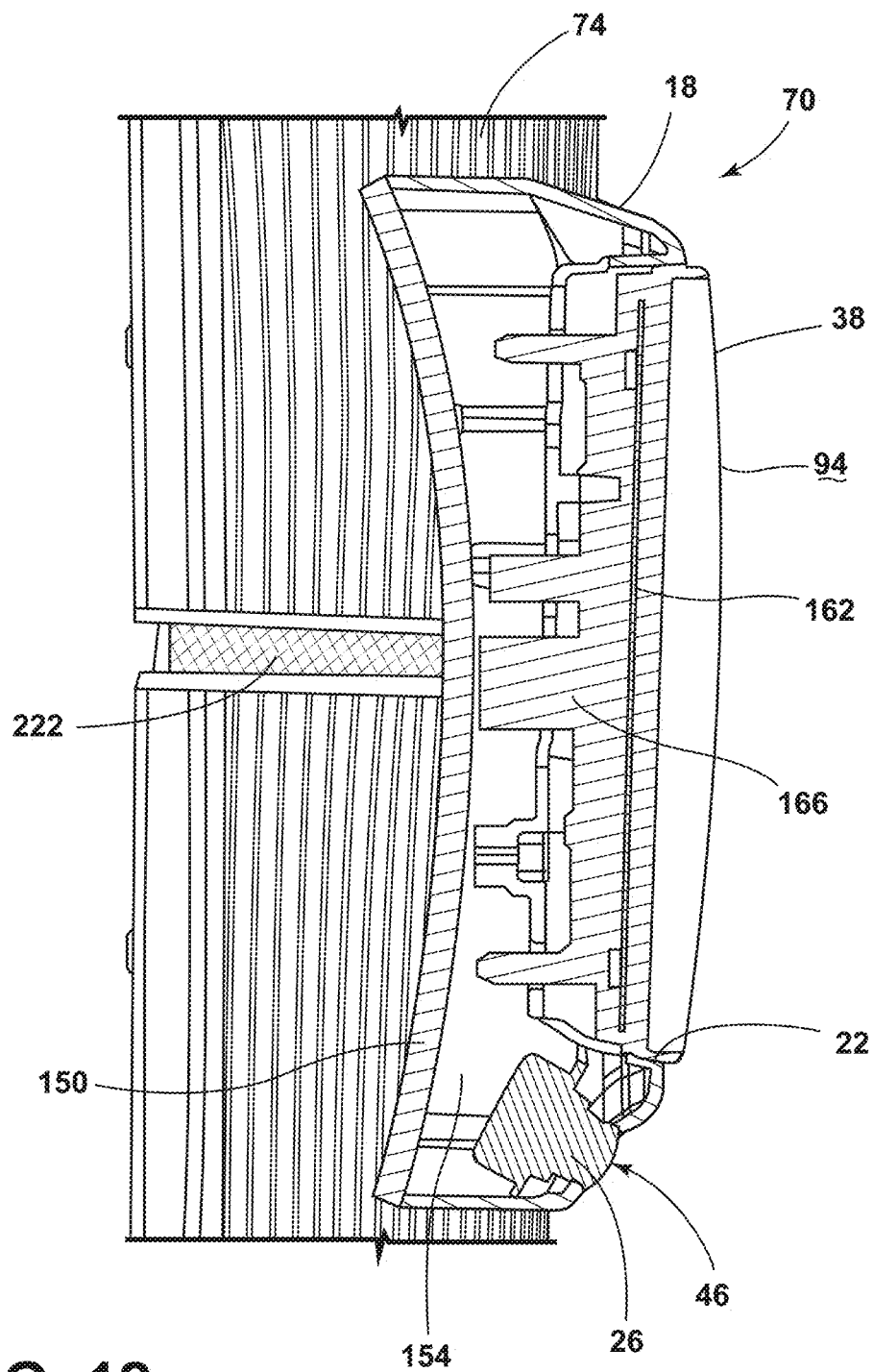
FIG. 12 is a cross-sectional view of the vehicle badge assembly of FIG. 2, taken at line XI-XI.

Referring to FIGS. 1 and 12, the badge assembly 70 may be coupled to the grille 74 of the vehicle 14. In a non-limiting example, the base 150 may be coupled to an outer surface of the grille 74. The housing 18 may extend outward from the grille 74. The lens 38 may be disposed above the image-based assembly 46. The image-based assembly 46 may be angled downward toward the ground area adjacent to the vehicle 14 in order to display the projected image 58.

According to various aspects, the grille 74 may define additional lighting features 222. The additional lighting features 222 may operate separately from and/or in conjunction with the badge assembly 70. The additional lighting features 222 may be any practicable lighting configuration for the grille 74 to provide the selected appearance of the grille 74.

Figure 13:
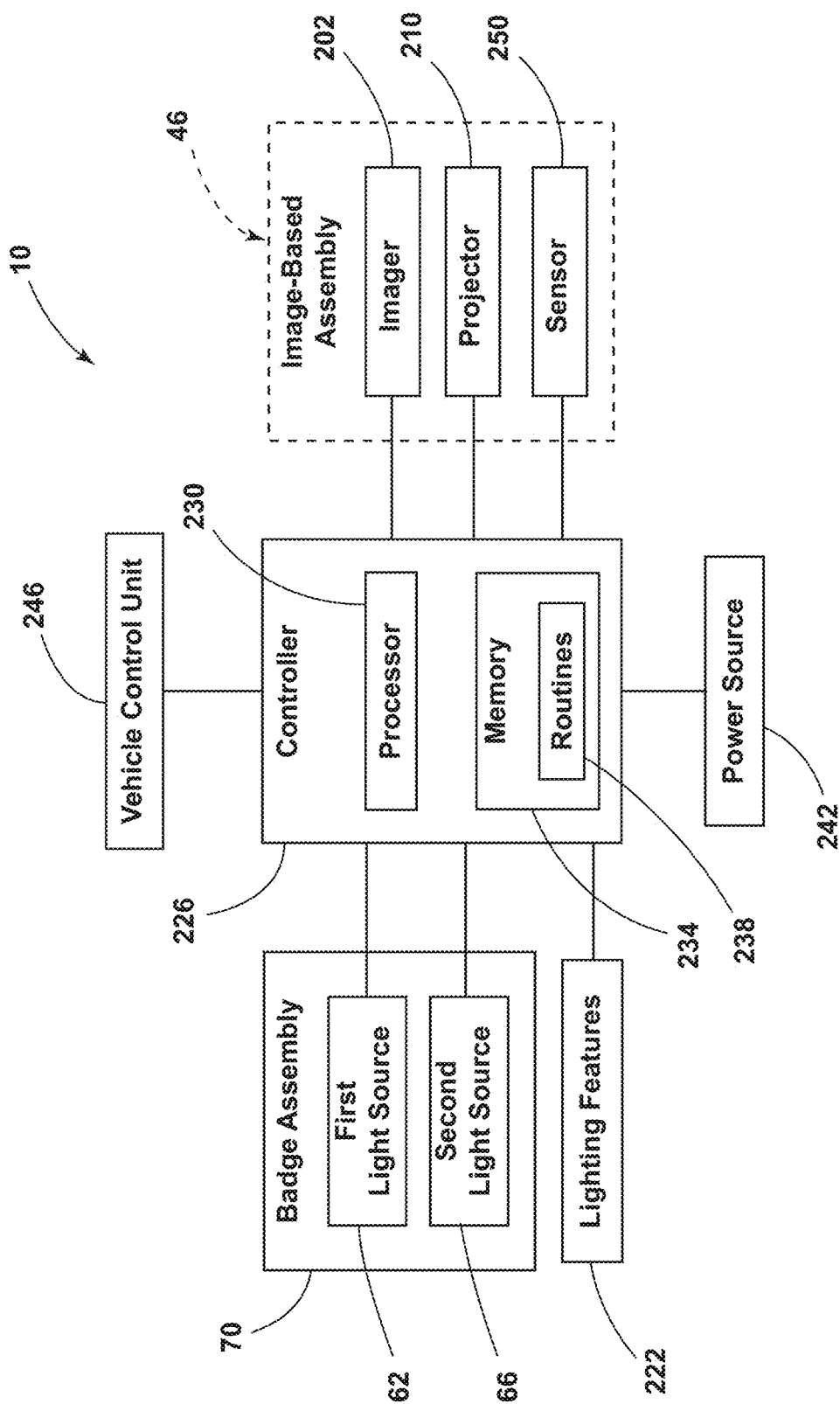
FIG. 13 is a block diagram of a badge system for a vehicle, according to one example.

Referring to FIG. 13, and with further reference to FIGS. 1-12, the badge system 10 includes a controller 226 having a processor 230, a memory 234, and other control circuitry. Instructions or routines 238 are stored within the memory 234 and executable by the processor 230. The routines 238 may include instructions regarding the operation of the first and second light sources 62, 66 and the image-based assembly 46. The controller 226 may be operably coupled to a power source 242, which may be a power source for the vehicle 14 or a designated power source for the badge assembly 70. The controller 226 can selectively activate the first light source 62 and the second light source 66 to produce the desired image and/or lighting effects on the badge assembly 70.

Additionally or alternatively, the controller 226 may be in communication with the imager 202. The imager 202 may be configured to obtain image data from within the sensor field 50 and communicate the sensed information and/or image data to the controller 226. The controller 226 may be configured to operate the badge assembly 70 in response to the sensed information and/or may communicate the sensed information to a vehicle control unit 246. The vehicle control unit 246 may utilize the sensed information for any practicable purpose, including security and parking assistance.

According to various aspects, the badge system 10 may include a sensor 250 coupled to the badge assembly 70 or another location on the vehicle 14. The sensor 250 may define a field of detection 254 configured to sense a vehicle key fob associated with the specific vehicle 14 within the field of detection 254. When the sensor 250 senses the vehicle key fob for the associated vehicle 14, the sensor 250 may send a signal to the controller 226. In a non-limiting example, the controller 226 may activate the projector 210 of the image-based assembly 46 in response to the signal from the sensor 250.

Use of the present disclosure device may provide for a variety of advantages. For example, the gratings 42 may provide for the holographic image 76 on the badge assembly 70, thereby creating a floating effect. Additionally, the gratings 42 on the lens 38 may provide for a unique, jewel-light appearance for the badge assembly 70. Also, the gratings 42 may provide for a unique appearance that may be substantially hidden and then glistens when ambient light 72 or the light 68 from the second light source 66 impinges on the gratings 42. Moreover, the gratings 42 may be defined through the use of a femtosecond laser, which can produce the gratings 42 having a thickness 110 as thin as 100 nm. Further, the light-transmissive feature 30 may provide for an additional unique aesthetic appearance for the badge assembly 70. The light-transmissive feature 30 may provide for an illuminated feature on the side 34 of the badge assembly 70. Also, the image-based assembly 46 may be operated in both a projector mode and a camera mode, providing additional functionality to the badge assembly 70. Additionally, the projector 210 of the image-based assembly 46 may produce the projected image 58 in response to the sensor 250 sensing the key fob associated with the vehicle 14. Also, the badge assembly 70 may be coupled to the grille 74 and may operate separately from other lighting features of the vehicle 14, such as high or low beams, turn signals, etc. Moreover, the badge assembly 70 may reduce manufacturing and production costs. Additionally, the badge assembly 70 may be less bulky through the use of the lens 38 with the defined gratings 42. Additional benefits or advantages of using this device may also be realized and/or achieved.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

According to at least one aspect of the present disclosure, a vehicle badge system includes a housing that defines an opening and an aperture proximate the opening. The housing defines a light-transmissive feature on a side thereof. A lens is coupled to the housing proximate the opening. The lens defines at least one grating. An image-based assembly defines a sensor field to obtain data. The image-based assembly defines a projector field to display a projected image. A first light source is configured to direct light through the light-transmissive feature. A second light source is configured to direct light through the lens. The lens includes at least one grating configured to diffract the light emitted from the second light source. Embodiments of the aspect of the disclosure can include any one or a combination of the following features:

- at least one grating defines at least one of a diffraction grating, a holographic grating, and a spaced holographic grating;
- at least one grating includes a first grating and a second grating and a first grating is configured to diffract light into a first image and a second grating is configured to diffract the light into a second image;
- a first image is at least one of a logo, word, design, and pattern, and a second image is a background for the first image;
- a light-transmissive feature defines at least one of a logo, word, design, and pattern;
- an outer surface of a lens is flat;
- a sensor is configured to sense a vehicle key fob, a controller is operably coupled to a sensor and an image-based assembly, and the image-based assembly is configured to display a projected image in response to the sensor sensing the vehicle key fob; and
- an image-based assembly includes an imager that defines a sensor field.

According to another aspect of the present disclosure, a vehicle badge assembly includes a housing that defines an opening. The housing defines at least one light-transmissive feature on a side thereof. A lens is coupled to the housing proximate the opening. The lens defines an optic. A first light source is disposed in the housing. The first light source is configured to emit light through the lens to produce an image. A second light source is disposed within the housing. The second light source is configured to direct light through the at least one light-transmissive feature. Embodiments of another aspect of the disclosure can include any one or a combination of the following features:

- an image-based assembly is coupled to the housing, and the image-based assembly defines a sensor field to obtain data and a projector field to display a projected image;
- a first light source is configured to direct light in a first direction and a second light source is configured to direct light in a second direction normal to the first direction;
- a light guide extends between a second light source and at least one light-transmissive feature;
- at least one light-transmissive feature includes a first light-transmissive feature and a second light-transmissive feature, and the first and second light-transmissive features are disposed on opposing sides of a housing; and
- a lens has an outer surface and an inner surface, and an inner surface defines an optic.

According to another aspect of the present disclosure, a badge assembly for a vehicle includes a base. A housing is coupled to the base. The housing defines a first light-transmissive feature on a first side and a second light-transmissive feature on a second side. A lens is coupled to the housing. A first light source is disposed within the housing and is configured to direct light through the first light-transmissive feature. A second light source is disposed within the housing and is configured to direct light through the second light-transmissive feature. Embodiments of another aspect of the disclosure can include any one or a combination of the following features:
- a third light source is disposed within a housing, and the third light source is configured to direct light through a lens;
- a lens defines an optic configured to diffract light into an image;
- an image-based assembly defines a projector field, and the image-based assembly is configured to project an image within the projector field;
- an image-based assembly includes an imager that defines a sensor field to obtain image data; and
- a third light source is disposed adjacent to a lens and the lens defines an optic configured to collimate light emitted by the third light source.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle badge system, comprising:
   a housing defining an opening and an aperture proximate the opening, wherein the housing defines a light-transmissive feature on a side thereof;
   a lens coupled to the housing proximate the opening, wherein the lens defines at least one grating;
   an image-based assembly coupled to the housing and defining a sensor field to obtain data, wherein the image-based assembly defines a projector field to display a projected image;
   a first light source configured to direct light through the light-transmissive feature; and
   a second light source configured to direct light through the lens, wherein the at least one grating is configured to diffract the light emitted from the second light source.

2. The vehicle badge system of claim 1, wherein the at least one grating includes a first grating and a second grating, and wherein the first grating is configured to diffract the light into a first image and the second grating is configured to diffract the light into a second image.

3. The vehicle badge system of claim 2, wherein the first image is at least one of a logo, word, design, and pattern, and wherein the second image is a background for the first image.

4. The vehicle badge system of claim 1, wherein the at least one grating defines at least one of a diffraction grating, a holographic grating, and a spaced holographic grating.

5. The vehicle badge system of claim 1, wherein the light-transmissive feature defines at least one of a logo, word, design, and pattern.

6. The vehicle badge system of claim 1, wherein an outer surface of the lens is flat.

7. The vehicle badge system of claim 1, further comprising:
   a sensor configured to sense a vehicle key fob; and
   a controller operably coupled to the sensor and the image-based assembly, wherein the image-based assembly is configured to display the projected image in response to the sensor sensing the vehicle key fob.

8. The vehicle badge system of claim 1, wherein the image-based assembly includes an imager that defines the sensor field.

9. A vehicle badge assembly, comprising:
   a housing defining an opening, wherein the housing defines at least one light-transmissive feature on a side thereof;
   a lens coupled to the housing proximate the opening, wherein the lens defines an optic;
   a first light source disposed in the housing, wherein the first light source is configured to emit light through the lens to produce an image;
   a second light source disposed within the housing, wherein the second light source is configured to direct light through the at least one light-transmissive feature; and
   an image-based assembly coupled to the housing, wherein the image-based assembly defines a sensor field to obtain data and a projector field to display a projected image.

10. The vehicle badge assembly of claim 9, wherein the first light source is configured to direct the light in a first direction and the second light source is configured to direct the light in a second direction normal to the first direction.

11. The vehicle badge assembly of claim 9, further comprising:
   a light guide extending between the second light source and the at least one light-transmissive feature.

12. The vehicle badge assembly of claim 9, wherein the at least one light-transmissive feature includes a first light-transmissive feature and a second light-transmissive feature, and wherein the first and second light-transmissive features are disposed on opposing sides of the housing.

13. The vehicle badge assembly of claim 9, wherein the lens has an outer surface and an inner surface, and wherein the inner surface defines the optic.

14. A badge assembly for a vehicle, comprising:
   a base;
   a housing coupled to the base, wherein the housing defines a first light-transmissive feature on a first side and a second light-transmissive feature on a second side;
   a lens coupled to the housing;
   a first light source disposed within the housing and configured to direct light through the first light-transmissive feature;
   a second light source disposed within the housing and configured to direct light through the second light-transmissive feature; and
   an image-based assembly coupled to the housing and defining a projector field, wherein the image-based assembly is configured to project an image within the projector field, and wherein the image-based assembly includes an imager defining a sensor field to obtain image data.

15. The badge assembly of claim 14, further comprising:
a third light source disposed within the housing, wherein the third light source is configured to direct light through the lens.

16. The badge assembly of claim 15, wherein the lens defines an optic configured to diffract the light into an image.

17. The badge assembly of claim 14, further comprising:
a third light source disposed adjacent to the lens, wherein the lens defines an optic configured to collimate light emitted by the third light source.

\* \* \* \* \*